United States Patent
Goland et al.

(10) Patent No.: US 6,262,390 B1
(45) Date of Patent: Jul. 17, 2001

(54) REPAIR PROCESS FOR ALUMINUM NITRIDE SUBSTRATES

(75) Inventors: David B. Goland, New Paltz; Mark J. LaPlante, Walden; David C. Long, Wappingers Falls; Dale C. McHerron, Staatsburg; Krishna G. Sachdev, Hopewell Junction; Subhash L. Shinde, Cortlandt, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/211,595

(22) Filed: Dec. 14, 1998

(51) Int. Cl.[7] .................................................. B23K 26/00
(52) U.S. Cl. ............................... 219/121.85; 219/121.84
(58) Field of Search ........................ 219/121.61, 121.84, 219/121.85, 121.86; 528/174, 185, 383

(56) References Cited

U.S. PATENT DOCUMENTS

| 4,413,020 | * | 11/1983 | McKee et al. ................... 219/121.85 |
| 4,569,988 | * | 2/1986 | Scola et al. ........................... 528/353 |
| 4,898,650 | | 2/1990 | Wu et al. . |
| 5,176,744 | | 1/1993 | Muller . |
| 5,286,533 | | 2/1994 | Komatsu et al. . |
| 5,314,725 | | 5/1994 | Morishita . |
| 5,458,281 | | 10/1995 | Downing et al. . |
| 5,620,132 | | 4/1997 | Downing et al. . |
| 5,757,079 | | 5/1998 | McAllister et al. . |
| 5,866,250 | * | 2/1999 | Oka et al. ............................ 528/353 |

FOREIGN PATENT DOCUMENTS

| 61-206587 | * | 9/1986 | (JP) ................................. 219/121.85 |
| 62-192283 | * | 8/1987 | (JP) ................................. 219/121.84 |
| 63-180393 | * | 7/1988 | (JP) ................................. 219/121.84 |
| 3-50796 | * | 3/1991 | (JP) . |

* cited by examiner

*Primary Examiner*—Geoffrey S. Evans
(74) *Attorney, Agent, or Firm*—DeLio & Peterson, LLC; Peter W. Peterson; Aziz M. Ahsan

(57) ABSTRACT

A method to repair Aluminum Nitride (AlN) substrates is disclosed wherein a frequency doubled Q-switched Nd:YAG laser is used to remove unwanted metallurgy. The substrate is place in a liquid filled work chamber which acts to prevent metallic species of AlN from forming. The repair site can be sealed with a novel polymer coating to prevent contamination or corrosion. Repairs can be made to buried or surface metallurgy.

24 Claims, 6 Drawing Sheets

REPAIR PROCESS FOR ALUMINUM NITRIDE SUBSTRATES

BACKGROUND OF THE INVENTION

1. Field of the Invention

This invention is directed to microelectronic devices and, in particular, to a method and apparatus for repairing aluminum nitride substrates for such devices.

2. Description of Related Art

Multi-layered electronic interconnect packages (substrates) for analog and/or digital circuits can be fabricated from a variety of materials such as alumina, glass, ceramic, epoxy-glass (i.e. FR4), and aluminum nitride (AlN) among others. In the choice of these materials, low dielectric constant is an important consideration. Additionally, it may be desirable for the material to exhibit a high thermal conductivity so that it can transfer heat away from the electrical device mounted on it, to its opposite surface where it can be more easily removed. Aluminum nitride exhibits both these desirable characteristics, as it has a dielectric constant lower than alumina (8.5), thermal conductivity about 6 to 8 times higher than alumina, and, more importantly, a coefficient of thermal expansion (TCE) closely matched to silicon (4.5 ppm/° C.). All packaging materials are chosen for their low dielectric constants.

In the course of manufacturing, design errors, manufacturing defects or engineering design changes can be made which render the interconnect package useless. These errors include internal shorts in metallurgy within the layers of the substrate, as well as shorts on the surface due to manufacturing errors and/or other plating defects. Due to the high cost of fabricating interconnect packages in AlN, coupled with the fact that these errors are most often detected at testing after the substrates are completely fabricated (with maximum cost and time incurred), it is highly desirable to be able to rework the substrates and repair them.

Repair of AlN substrates can be divided into two categories: 1) repair or isolation of surface structures due to design errors such as via to pad connections, or via to ground plane shorts, engineering changes (ECs), or manufacturing defects such as extraneous plating shorting two features (i.e. pad to pad, pad to ground plane etc.); and 2) repair or isolation of sub-surface structures due to design errors or manufacturing errors (i.e. severing internal connections such as buried lines).

Surface repairs are performed by existing methods such as abrasive grinding, scraping and the like. These existing methods are unacceptable due to the typical size of the defect and proximity of the defect to other features. Also, abrasive grinding and/or scraping typically do not adequately isolate the defect but tend to imbed the metallic material into the substrate causing a high resistance short which is typically not an acceptable repair. Abrasive grinding also creates a great deal of debris which can be detrimental when found on a completed part.

Sub-surface repairs cannot be done by mechanical means due to the extremely tight tolerances, small sizes, and close proximity of other surface and/or buried structures. Sub-surface repairs can sometimes be accomplished on other substrate materials (i.e. alumina, glass ceramic, epoxy-glass etc.), by utilizing a finely focused laser beam. It has been found that when performed on an AlN substrate in air, the heat produced by the laser beam forms a plasma of conductive aluminum which tightly adheres to the substrate in the area of the repair. Additionally, the high temperature developed at the point of focus also locally changes the matrix of the aluminum nitride, causing metallic aluminum to be formed at the surface. This metallic surface layer provides an electrically conductive path at the repair area making such repairs unusable due to their low electrical resistance.

Bearing in mind the problems and deficiencies of the prior art, it is therefore an object of the present invention to provide a method for repairing AlN substrates which isolates the defect and minimizes high resistance shorts.

It is another object of the present invention to provide a method of repairing sub-surface defects in AlN substrates which does not produce a coating of conductive aluminum at the repair area.

A further object of the invention is to provide a method of removing unwanted surface metallurgy on AlN substrates which does not produce a coating of conductive aluminum at the repair area.

It is yet another object of the present invention to provide a novel work chamber for the repair of AlN substrates such that elemental aluminum is not produced at the repair area.

It is yet another object of the present invention to provide a method of using and an improved composition to passivate and seal the repair area from contamination.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method of repairing an aluminum nitride substrate comprising the steps of: (a) providing an aluminum nitride substrate in need of repair; (b) providing a laser energy source; (c) immersing at least a portion of an area in need of repair of the substrate in a liquid; (d) emitting the laser energy through the liquid over the portion of the substrate in need of repair; and (e) forming a repair area, wherein immersing the substrate in a liquid sufficiently cools the substrate when emitting the laser energy over the portion of the substrate in need of repair such that the repair area is substantially free from elemental aluminum.

In a second aspect, the present invention is directed to a method of repairing an aluminum nitride substrate comprising the steps of: (a) providing a liquid filled work chamber; (b) providing an aluminum nitride substrate having metallization; (c) placing the substrate inside the chamber; and (d) removing a portion of the metallization of the substrate and forming a repair area, wherein the liquid filled work chamber sufficiently cools the substrate, and the repair area is substantially free from elemental aluminum.

The liquid filled work chamber may have an optical window such that step (d) comprises removing a portion of the metallization by transmitting a laser energy source through the optical window. Preferably, the laser energy source is a YAG laser.

Preferably, step (a) comprises providing a deionized water filled work chamber which may have a jet of liquid directed proximate to the repair area. During step (d) the jet of liquid within the liquid filled chamber sweeps away residue and air bubbles from the repair area during the step of removing the metallization such that the formation of elemental aluminum is minimized. The present invention may further include the step of removing residue produced during the step of removing the metallization.

This method may also further include the step of filling the repair area with an insulating polymer to passivate and seal the repair area. The step of filling the repair area with an insulating polymer may comprise filling the repair area with a flexible chain polyimide material derived from non-rigid dianhydrides and aromatic diamines having at least one hexafluoroisopropylidene functionality. The polyimide material may have the following structure:

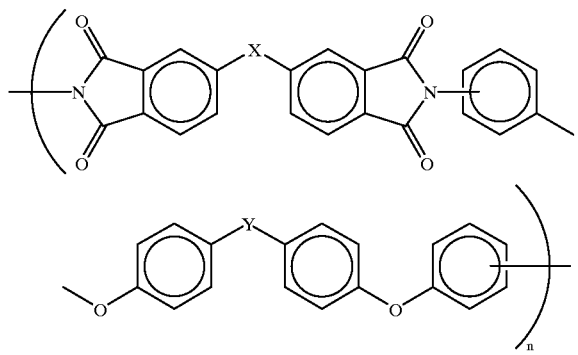

wherein X is selected from the group consisting of O, $C(CF_3)_2$, and CO, and wherein Y is $C(CF_3)_2$.

The step of filling the repair area with an insulating polymer may comprise at least one application of the polymer but multiple applications may also be utilized. Where multiple applications are contemplated the step of filling the repair area with an insulating polymer may comprise the steps of: (a) filling the repair area with a first portion of a polymer; (b) curing the first portion of the polymer; (c) filling the repair area with another portion of the polymer; (d) curing the another portion of the polymer; and (e) repeating the steps (c) and (d) until the repair area is substantially filled with the cured polymer.

The step of filling the repair area with an insulating polymer may further include the step of at least partially curing the insulating polymer prior to each application of the polymer. Preferably, curing the sealant may comprise the steps of: (a) heating the substrate at about 80° C. to 90° C. for about 30 minutes; (b) followed by heating the substrate at about 140° C. to 150° C. for about 30 minutes; (c) followed by heating the substrate at about 210° C. to 230° C. for about 30 minutes; and (d) a final curing at about 300° C. to 375° C. for about 30 to 60 minutes.

Most preferably, wherein the insulating polymer has the formula

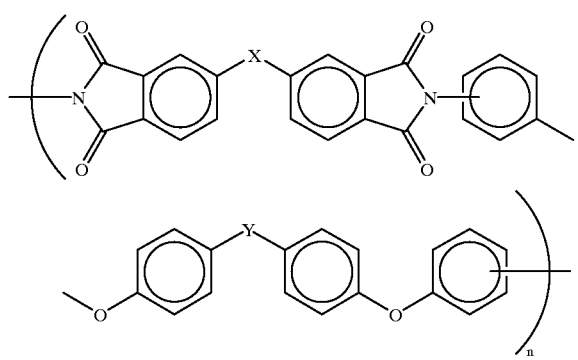

X may be selected from the group consisting of O, $C(CF_3)_2$, and CO, and Y may be $C(CF_3)_2$, step (b) comprises heating the substrate having a first portion of the polymer from about room temperature to about 150° C. and heating the substrate at about 150° C. for about 20 minutes; step (d) comprises heating the substrate having a second portion of the polymer from about 150° C. to 230° C. for about 30 minutes, and heating the substrate at about 230° C. for about 30 minutes followed by heating the substrate having a third portion of the polymer from about 230° C. to 300° C., and heating the substrate at about 300° C. for about 30 minutes. Preferably, the rate of heating the substrate is 5° C./minute. Once the cure cycle is complete, the step of cooling the substrate to room temperature at a rate of 3° C./minute may be further included.

In another aspect, the present invention is directed to a method of severing a via connection to surface metallurgy on an aluminum nitride substrate comprising the steps of: (a) providing an aluminum nitride substrate having a via connection to surface metallurgy; (b) providing a liquid filled chamber having an optical window; (c) placing the substrate inside the chamber; (d) providing a laser energy source; (e) applying the laser energy through the optical window to the surface metallurgy removing a desired amount of surface metallurgy exposing the via; (f) applying the laser energy through the optical window over an area encompassing the via until a desired depth of material has been removed; (g) forming a repair area; and (h) simultaneously flushing the material removed from the surface metallurgy and the via with a jet of liquid within the chamber.

The present invention may further include the step of applying a sealant to fill the repair area. The step of applying a sealant to fill the repair area may comprise applying a flexible chain polyimide material derived from non-rigid dianhydrides and aromatic diamines having at least one hexafluoroisopropylidene functionality. The step of applying a sealant to fill the repair area contemplates at least one application of the sealant. Preferably, the method further includes the step of at least partially curing the sealant prior to each application of the sealant.

In yet another aspect, the present invention is directed to an aluminum nitride substrate repaired in accordance with the previous aspect of the present invention utilizing a sealant having the formula

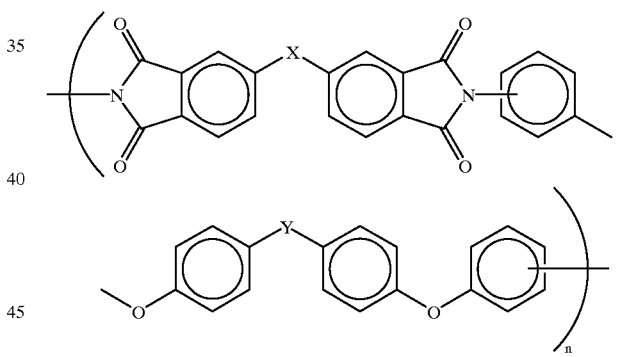

wherein X is selected from the group consisting of O, $C(CF_3)_2$, and CO, and wherein Y is $C(CF_3)_2$.

In yet another aspect, the present invention is directed to a method of severing an internal connection in an aluminum nitride substrate comprising the steps of: (a) providing an aluminum nitride substrate having buried metallurgy in need of severing; (b) providing a liquid filled chamber having an optical window; (c) placing the substrate inside the chamber; (d) providing a laser energy source; (e) applying the laser energy through the optical window to machine a trench into the substrate of such depth as to sever the buried metallurgy forming a repair area; and (f) simultaneously removing any repair residue with a jet of liquid in the chamber.

The method may further include the step of applying a sealant to fill the repair area. The sealant may comprise applying a flexible chain polyimide material derived from non-rigid dianhydrides and aromatic diamines having at least one hexafluoroisopropylidene functionality. Preferably, the step of applying a sealant to fill the repair area comprises at least one application of the sealant. Most preferably, the method may further include the step of at least partially curing the sealant prior to each application of the sealant. Even more preferably, the step of applying a sealant to fill the repair area comprises the steps of: (g) filling the repair area with a first portion of a polymer; (h) curing the first portion of the polymer; (i) filling the repair area with another portion of the polymer; (j) curing the another portion of the polymer; and (k) repeating the steps (i) and (j) until the repair area is substantially filled with the cured polymer.

In yet another aspect, the present invention is directed to an aluminum nitride substrate repaired in accordance with the previous aspect of the present invention utilizing a sealant having the formula

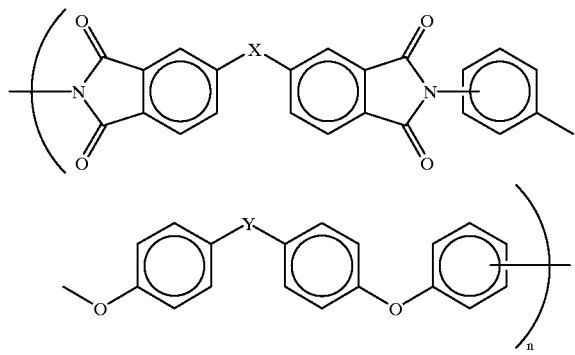

wherein X is selected from the group consisting of O, $C(CF_3)_2$, and CO, and wherein Y is $C(CF_3)_2$.

In still yet another aspect, the present invention is directed to a method of removing surface metallurgy on an aluminum nitride substrate comprising the steps of: (a) providing a liquid filled chamber having an optical window; (b) providing an aluminum nitride substrate having surface metallurgy in need of removal; (c) placing the substrate inside the chamber; (d) providing a laser energy source; (e) applying the laser energy source through the optical window to remove the surface metallurgy on the substrate; and (f) forming a repair area where the surface metallurgy has been removed. The steps of filling the repair area with a polymer sealant and curing the polymer sealant may be added.

In still yet another aspect, the present invention is directed to an aluminum nitride substrate repaired in accordance with the previous aspect of the present invention utilizing a sealant having the formula

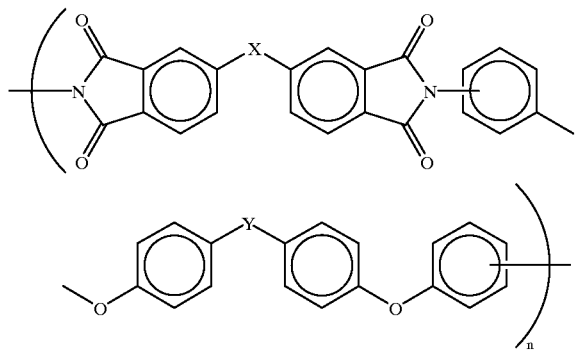

wherein X is selected from the group consisting of O, $C(CF_3)_2$, and CO, and wherein Y is $C(CF_3)_2$.

In a further aspect, the present invention is directed to an apparatus for laser repair of aluminum nitride substrates comprising a chamber; a substrate fixture within the chamber; at least one liquid supply port leading into the chamber; a liquid return port to allow liquid to exit the chamber; a laser transparent cover; and a laser energy source adapted to emit a laser beam through the laser transparent cover to impinge a substrate on the fixture. Preferably, the chamber has a recessed bottom portion, the recessed bottom portion having a shoulder along a circumference of the recessed bottom portion such that a substrate is suspended in the chamber by resting on the shoulder of the recessed bottom portion of the chamber. Most preferably, an air pocket exists between a bottom surface of a substrate and the recessed bottom portion of the chamber. Preferably, the substrate fixture comprises clamps to secure a substrate within the chamber. Preferably, the laser transparent cover comprises quartz glass. The apparatus of the present aspect may further include an O-ring disposed on a circumference of the chamber such that attachment of the laser transparent cover to the chamber produces a liquid tight seal within the chamber.

In still a further aspect, the present invention is directed to a semiconductor device comprising an aluminum nitride substrate having at least one microelectronic device thereon; and a polyimide applied to at least a portion of a surface of the substrate, the polyimide having the structure

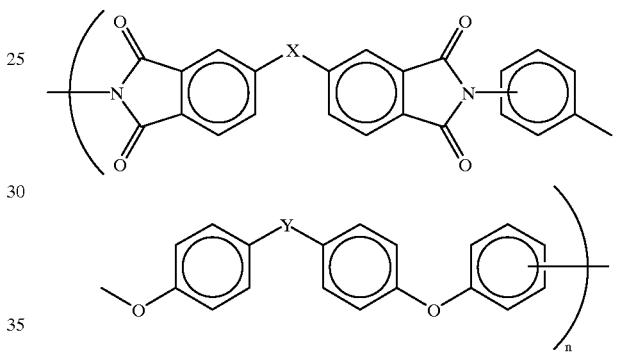

wherein X is selected from the group consisting of O, $C(CF_3)_2$, and CO, and wherein Y is $C(CF_3)_2$ disposed on a portion of the substrate.

In still a further aspect, the present invention is directed to a semiconductor device comprising a ceramic substrate having at least one microelectronic device thereon; and polyimide applied to at least a portion of a surface of the substrate, the polyimide having the structure

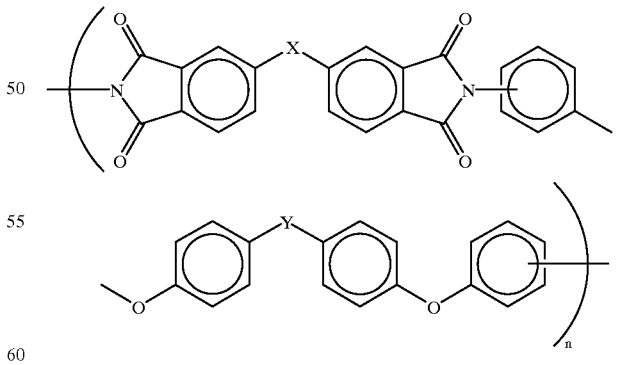

wherein X is selected from the group consisting of O, $C(CF_3)_2$, and CO, and wherein Y is $C(CF_3)_2$ disposed on a portion of the substrate.

In still a further aspect, the present invention is directed to a method of repairing an aluminum nitride substrate comprising the steps of: (a) providing an aluminum nitride substrate having at least one microelectronic device; (b) immersing the substrate in a liquid; (c) machining a portion of the microelectronic device while the substrate is immersed to form a repair area; and (d) sealing the repair area with a polymer, said polymer having the structure

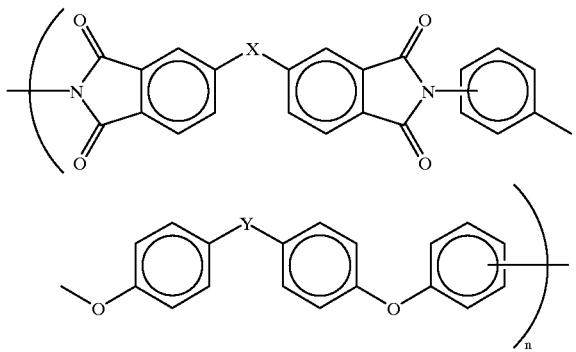

wherein X is selected from the group consisting of O, C(CF$_3$)$_2$, and CO, and wherein Y is C(CF$_3$)$_2$.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1A:
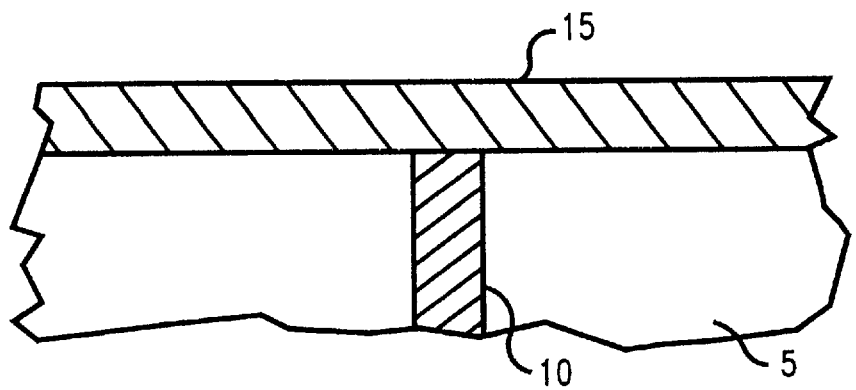
FIGS. 1a to 1d are elevated partial cross-sectional views showing the sequence of removing a via in accordance to a preferred embodiment of the present invention.

In describing the preferred embodiment of the present invention, reference will be made herein to FIGS. 1a to 6 of the drawings in which like numerals refer to like features of the invention. Features of the invention are not necessarily shown to scale in the drawings.

FIGS. 1a to 1d illustrate the first embodiment of the present invention wherein a via 10 connected to a surface feature 15 within an AlN substrate 5 is removed. For example, this surface feature, also referred to as surface metallurgy, can be either a metallized pad, blanket metallurgy such as a ground plane, a line connecting other pads, or undesired metallurgy such as extraneous plating. Such features can be formed either by design or error. Blanket metallurgy on the surface of the substrate may be required to both attach by soldering/brazing the substrate to another device, such as a heat sink or mounting device, as well as provide an electrical ground plane.

In order to remove the connection between the via 10 and the surface metallurgy 15, the substrate 5 must first be placed in an appropriate liquid filled work chamber 400 such as that illustrated in FIGS. 4a and 4b and described in more detail below. The repair site is then located using design coordinates (or visually using an appropriate viewing system if the via 10 is not obscured by the surface metallurgy 15).

Figure 1B:
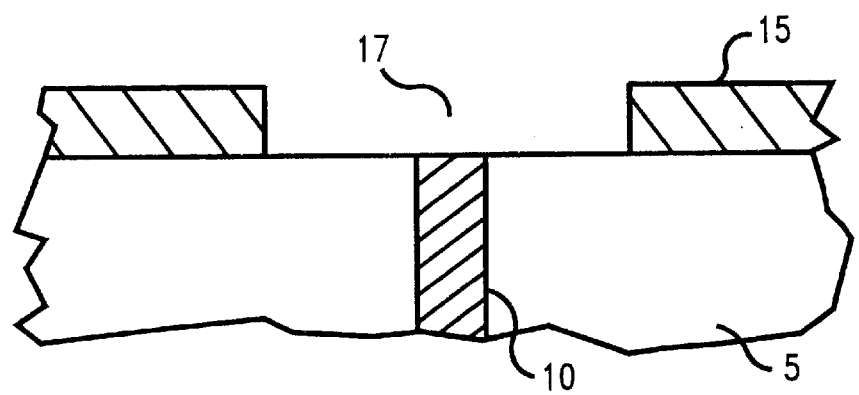
Figure 1C:
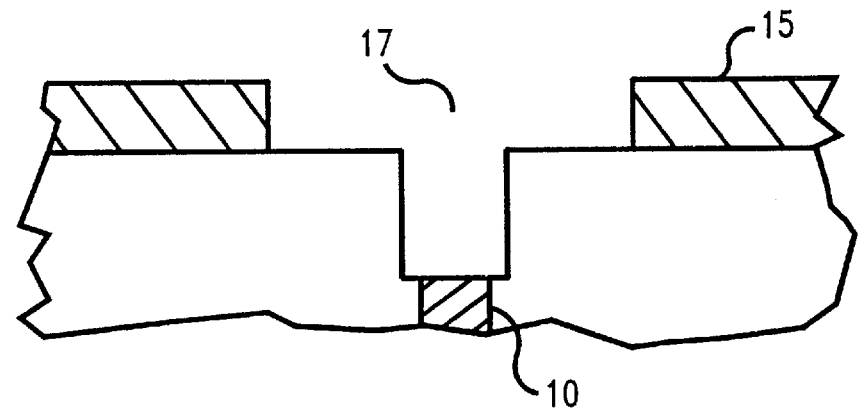
Figure 5A:
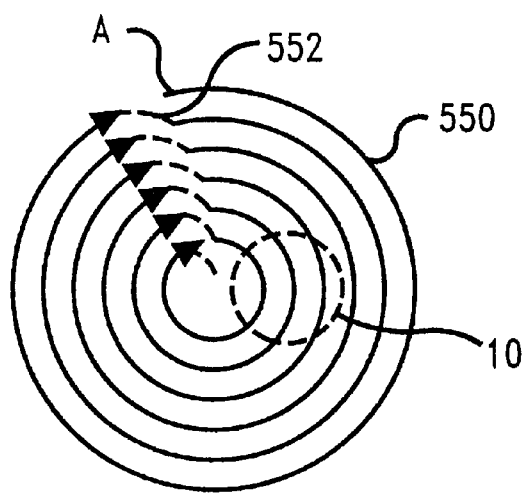
FIGS. 5a and 5b are examples of laser beam translation paths used in the present invention.

The surface metallurgy 15 is removed to form opening 17 as shown in FIG. 1b over a circular area, as depicted in FIG. 5a in more detail, to expose via 10. FIG. 5a shows the start of the laser beam at point A and continuing in a circular path 550; the dashed lines 552 represent when the laser beam is off. Opening 17 is large enough (typically about 0.020" diameter) to guarantee that the via 10 is sufficiently exposed (as shown in FIGS. 1b and 5c), so that its location is known for the subsequent step of removing the via metallurgy. The actual location of the via may vary from the design location due to non-uniform shrinkage or other variations caused by the manufacture of the substrate.

This first material removal step is done at a laser fluence level only high enough to remove the surface metallurgy 15 and not a significant portion of the AlN substrate 5 as shown in FIG. 1b. The focused laser beam has an extremely small spot size (typically about 3 μm to about 10 μm), therefore the spot must be translated in a regular pattern to remove the undesired or occluding material throughout the area of the repair. A typical translation path used in the current invention for such a removal step is shown in FIG. 5a. With a laser beam spot size of about 10 μm, the beam is stepped about 5 microns per pass, creating an overlap of approximately 5 microns. This assures that all the surface metallurgy 15 is removed. This present embodiment includes the use of a focused laser beam which must be traversed about the repair area. It is possible, however, to utilize an "imaged" laser beam of the required area. This beam can be sized to remove the required metallurgy without translating about the repair area, or can be translated to remove even larger areas of metallurgy as required.

A Q-switched Nd:YAG laser such as Model No. 5604 manufactured by U.S. Laser Corp., Wyckoff, N.J., is used which generates an average power of up to about 1.0 watt TEM$_{00}$ at a second harmonic wavelength of about 0.5 μm at a repetition rate of about 1 kHz. With this given laser beam and an f/2.7 objective lens, approximately 0.001" of material would be removed per pass (given a translation rate of about 0.03"/sec and a line spacing of about 5 μm per pass). At this full power, to remove material to a depth of 0.02" would require translating the laser beam 20 times (passes) over the repair area. This high power, however, can be too high to remove the surface metallurgy 15 without damaging the underlying substrate material 5 even in a single pass. In the event that the overlaying metallurgy is significantly thinner, for example evaporated gold, which can be much less than 0.001" thick and is about 0.00025" thick. In this preferred embodiment, the laser power is reduced to about 25% resulting in a removal rate of about 0.00025" per pass, or just enough to remove the surface metallurgy 15 in one pass without damaging the substrate material 5.

Figure 6:
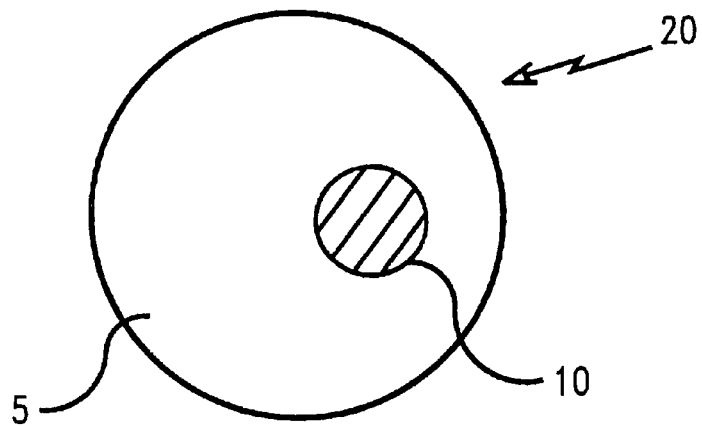
FIG. 6 is a top plan view of an exposed via following the removal of overlying metallurgy in accordance to a preferred embodiment of the present invention.

If soldering or brazing of blanket metallurgy is used, the undesired connection between the via and the metallurgy must be severed and the depth of the via increased to allow increased thickness of an insulating polymer coating so that when the substrate is attached, the via remains isolated from the surface. In the event that the blanket metallurgy is not to be attached to an electrically conductive surface as mentioned above, the following step of removing the via may not be needed and only a think layer if any of polymer coating may be required to seal the surface. It may be necessary, however, to re-center the laser over the now exposed via and repeat the above blanket metallurgy removal step to ensure acceptable clearance between the exposed via and the metallurgy. Following the removal of the surface metallurgy 15 as shown in FIG. 6, the laser is centered on the exposed via 10. The laser fluence is increased, and then translated about the area centered over the via 10 for several passes in a similar (but smaller) concentric circular pattern than that shown in FIG. 5a until an appropriate depth of material has been removed (see FIG. 1c).

It is essential that all laser repairs on AlN be performed under a liquid. The liquid dissipates the heat energy of the plasma created by the focused laser beam, causing the ejected material to condense and form a metallic solid prior to contacting the walls or bottom of the repair area thus preventing it from adhering to the surface of the AlN causing a conductive path.

Additionally, it prevents melting at the surface of the substrate 5 and subsequent formation of the metallic species at the repair site, allowing a non-conductive repair to be made. The liquid also serves to remove the metallic solid residue and other substrate debris from the repair area as the liquid flows through the work chamber. Although de-ionized water is the preferred liquid, other suitable liquids may be used.

Multiple passes can be made over the via 10 to assure that a sufficient depth of material is removed so that no conductive metal protrudes above the repair area. This second step effectively isolates the via 10 from the surface metallurgy 15 forming repair area 20.

Following the repair step, the substrate 5 is removed from the work chamber 400, and carefully and fully dried. Prior to use, the repair area 20 must be at least partially filled with a sealant material that both electrically insulates the repair area and prevents moisture and/or contaminants from entering the repair area and causing corrosion. In some applications, the repair area 20 must also remain planar (i.e. no sealant material must protrude above the surface of the substrate), as not to interfere with devices which may be mounted thereon.

We have discovered that effective protection of the repair area 20 can be obtained by depositing a coating of a flexible polyimide material derived from non-rigid dianhydrides and aromatic diamines of which at least one carries a hexaflouroisopropylidene functionality. The dianhydride monomers have the following structure:

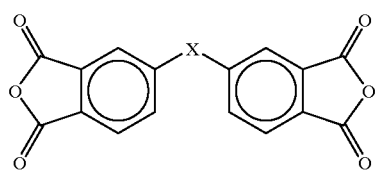

wherein X is O (for ODPA), CO (for BTDA, and $C(CF_3)_2$ (for 6-FDA). The diamine monomer has the following structure:

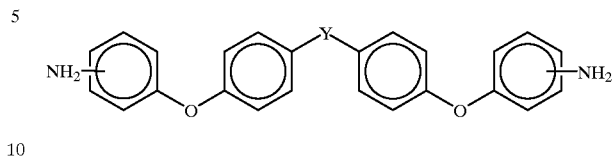

wherein Y is $C(CF_3)_2$ for BDAF. A representative polyimide of the present invention has the following structure:

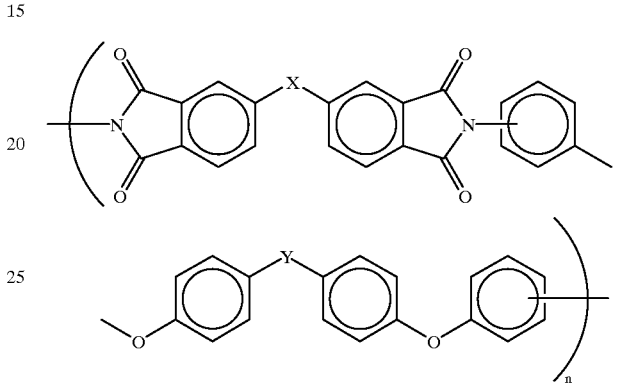

wherein X is O, and Y is $C(CF_3)_2$ for ODPA-BDAF; X and Y are $C(CF_3)_2$ for 6-FDA-BDAF; and X is CO, and Y is $C(CF_3)_2$ for BTDA-BDAF.

A preferred polyimide according to this invention is derived from a polyamic acid precursor obtained by polymerization of 2,2-bis[4-(4-aminophenoxy)-phenyl] hexofluoropropane (BDAF) and 1,4-oxydiphthalic anhydride (ODPA) having the following structure:

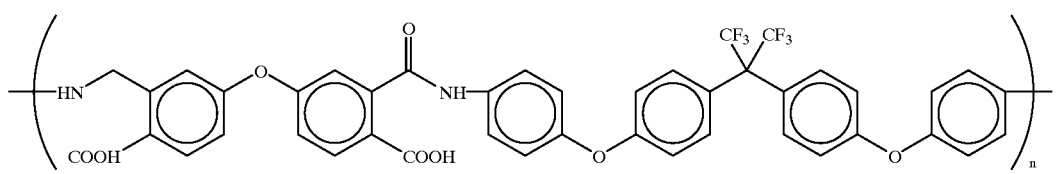

The ODPA-BDAF polyamic acid precursor solution is prepared by condensation polymerization of the two monomers in n-methyl pyrollidinone (NMP) with about 5 50 10% xylene (volume % in NMP/xylene mixture) using 1:1 stoichiometry (equimolar ratio of the two monomer species) at about 20 to 25 wt % solids. A viscous, clear solution is obtained upon completion of the monomer species which can be further diluted with 5 to 15 wt % of y-butyrolactone to obtain lower viscosity if necessary, and filtered through a 0.8 to 1.2 μm filter.

The filtered polyamic acid solution is used to fill the repair area by multiple applications using intermediate bake/cure cycles carried out in a nitrogen purged oven or furnace by step wise cure starting at about 850° C., for about 30 minutes, then at about 140° C. to 150° C. for about 30 minutes, followed by about 30 minutes at about 210° C. to 230° C., and a final cure at about 300° C. for about 30 minutes. Alternatively, a final cure at about 325–375° C. for about 30 to 60 minutes will not adversely affect the desired polyimide properties. The rate of heating occurs at about 5° C./minute. The resulting ODPA-BDAF polyimide has the following structure:

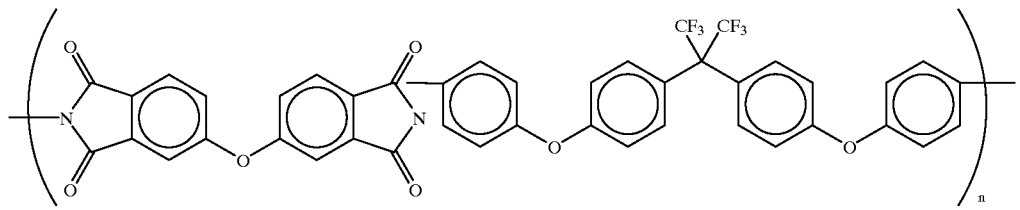

Figure 1D:
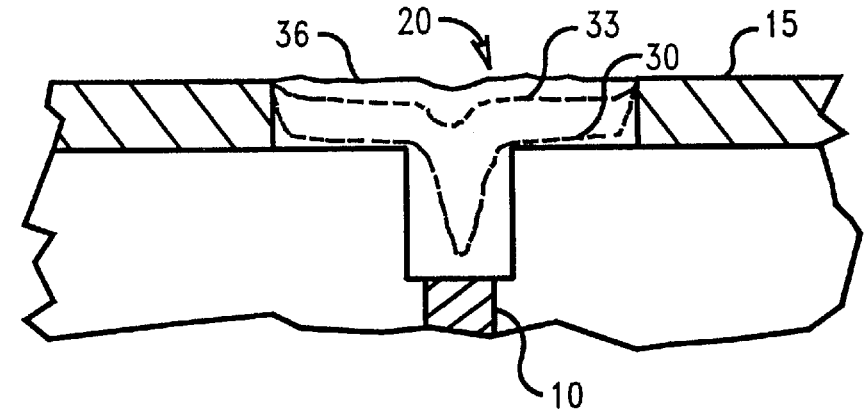

For multiple applications of the polymer as shown in FIG. 1d with reference to a first fill 30, a second fill 33 and a final fill 36 of the polymer material, an intermediate bake of about 150° C. to about 230° C. is used in between applications of the polymer followed by the final cure temperature of about 325–375° C. Although multiple applications of a sealant material is discussed herein, it may also be sufficient to apply just a single layer.

Typical mechanical and thermo-mechanical properties of about 350° C. to 400° C. cured ODPA-BDAF polyimide films were found to be as follows:

Elongation-at-break (% Eb); 60–65% (230° C. cured films show up to 80% Eb)

Elastic Modulus: 2.6–2.9 GPa

Ultimate Tensile Strength(UTS): 130–145 MPa

Glass Transition Temperature (Tg) : 250–270° C.

Linear Thermal expansion (TCE): 230° C. cured films show about 35–40 ppm

It has been unexpectedly found that the flexible chain polyimides carrying —Ar—O—Ar— and —Ar—O—Ar—6F—Ar—O—Ar— in the chain structure as represented by ODPA-BDAF polyimide have other highly desirable properties for use as insulation polymer for repair application disclosed according to this invention. Properties found in this class of polymers relevant to this application include: a high solids content yet having low viscosity polyamic solution showing low shrinkage upon cure; excellent adhesion to AlN and tungsten metallurgy without requiring surface modification or application of an adhesion promoter; good planarization of the polymer coating for further processing as needed; a low dielectric constant of <3.5; adhesion durability and good interface integrity with contacting surfaces; good surface wetting showing no non-wets on the contacting surfaces; improved solvent resistance of cured coatings; substantially no blisters or cracks found in the hole filling; and low moisture uptake temperature/humidity environments.

Other related polyimide materials which can also be used for the present invention include: BTDA-BDAF derived from benzophenone tetracarboxylic dianhydride (BTDA) and BDAF diamine; 6FDA-BDAF from hexafluoroisopropylidene 2,6-bis (phthalic) anhydride (6FDA); and ODPA-ODA-BDAF co-polymide derived by condensation polymerization of ODPA and mixture of 1,4-oxydianiline (ODA) and BDAF in NMP solvent. Alternatively, co-polyimides such as 6FDA-ODPA-ODA which is obtained by reacting a mixture of 6F dianhydride (6FDA) and ODPA with aromatic diamine 1,4-oxydianiline (ODA).

The polymer is applied using a small probe tip or hollow tube in numerous coats. With the proper whetting properties, it flows into the opening 17 left by the laser repair and adheres tightly to the walls of the repair as well as the area where the surface metallization was removed. Following the cure of the sealant, the substrate is ready to use. It may be noted that although the novel polymer discussed herein was found to work successfully for repairs made on aluminum nitride substrate, its utility can be applied to repairs on substrates composed of other materials such as alumina or glass-ceramic.

Figure 2A:
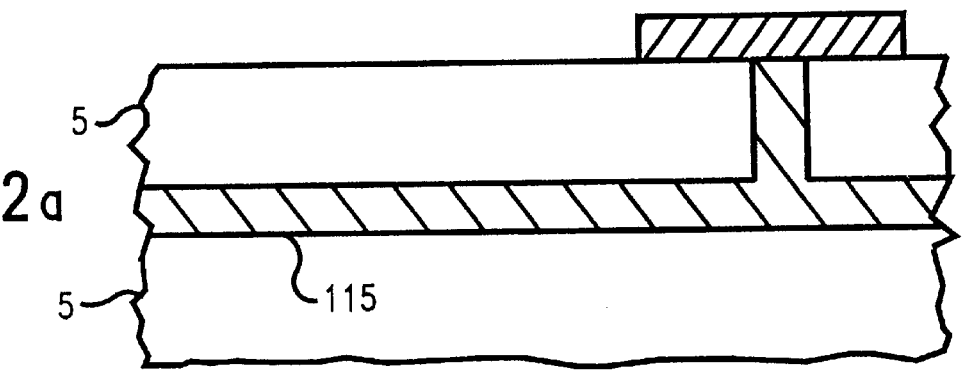
FIGS. 2a to 2c are elevated partial cross-sectional views showing the sequence of severing buried metallurgy in accordance to a preferred embodiment of the present invention.
Figure 2B:
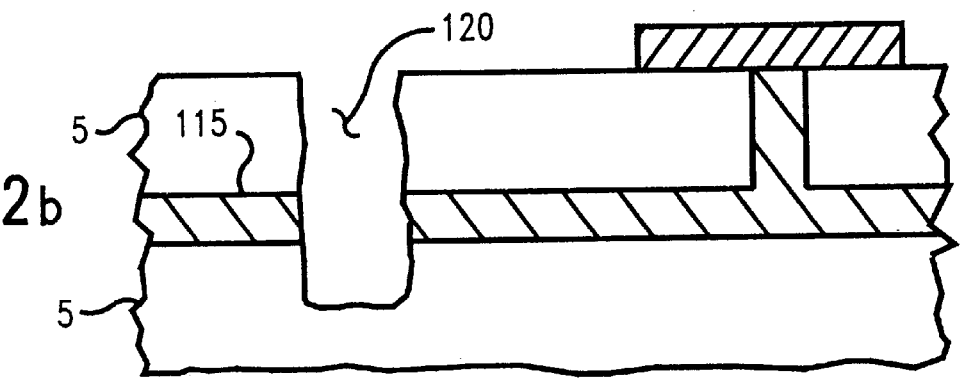
Figure 2C:
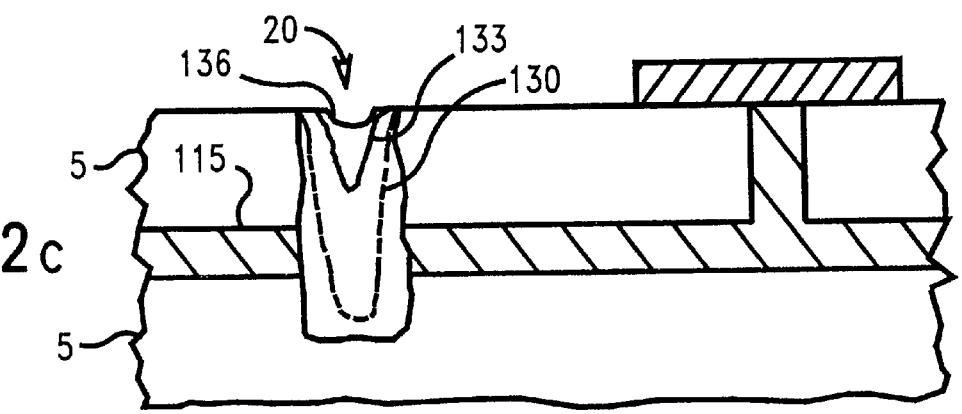

A second embodiment of the current invention is shown in FIGS. 2a to 2c, where an internal connection is to be severed. Such buried metallurgy 115 may be as much as about 0.020" deep within the substrate 5 as long as no other required metallurgy is above it to prevent the repair. In this type of repair, a trench 120 typically about 0.005" wide is machined into the AlN substrate 5 perpendicular to the orientation of the buried metallurgy 115.

To repair a substrate 5 with buried metallurgy 115, the repair area must first be defined and located on the substrate 5. Repair coordinates can be in reference to the edge of the part or in reference to surface features such as fiducials, pads or other visible features. Once the repair site is located, the buried metallurgy 115 can be reliably severed. For this second embodiment, a repair length would be at least about 0.010" wider than the width of the buried metallization 115 to be severed and the repair width would be approximately 0.005". Consideration should also be made to account for errors due to manufacturing (i.e. shrinkage variations, misalignment between layers etc.) so that a reliable repair can be performed.

Figure 5B:
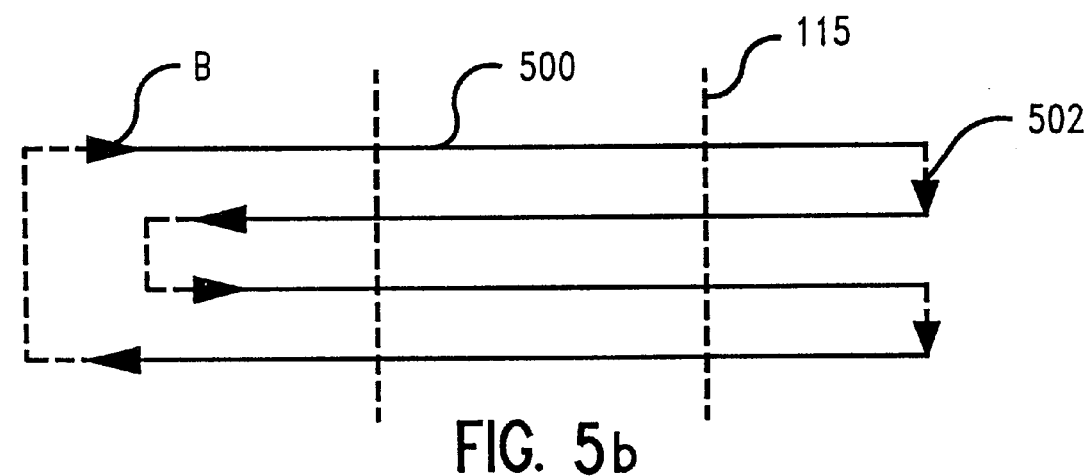

The laser beam is turned on at point B as shown in FIG. 5b and translated over the translation path 500 at least one time and up to 100 passes or more depending on the depth of the buried line. The dashed lines 502 represent when the laser beam has been turned off. The step size of the translation path 500 is approximately the same as that described in the first embodiment. Translation of the laser beam 500 is terminated when the depth of the trench 120 is greater than the depth of the buried metallization 115.

Once the desired depth of trench 120 has been reached and the buried metallurgy 115 severed, the substrate 5 is removed from the work chamber and carefully and fully dried. Prior to use, the trench 120 must be filled with a sealant material that both electrically insulates the repair area and prevents moisture and/or contaminates from entering the repair area and causing corrosion. As in the previous embodiment, the trench 120 is filled with the polymer of the present invention in multiple applications. The multiple applications are shown as a first fill 130, a second fill 133, and a final fill 136. Between each application is a curing of the polymer in conditions discussed above.

In addition, it may be desirable to actively probe the repair site during the repair process with a sensing device to determine when the connection is completely severed. This sensing device can include any of a variety of devices including a voltmeter, an ohm meter, a capacitive or inductive meter, a continuity tester or other device, with the preferred embodiment. The laser repair process can continue until at least one pass after the resistance across the repair site rises to over about 1M Ohms.

Typically, the fluence of the laser beam is greater for repairing sub-surface features than for surface features because much more material needs to be removed.

Figure 3A:
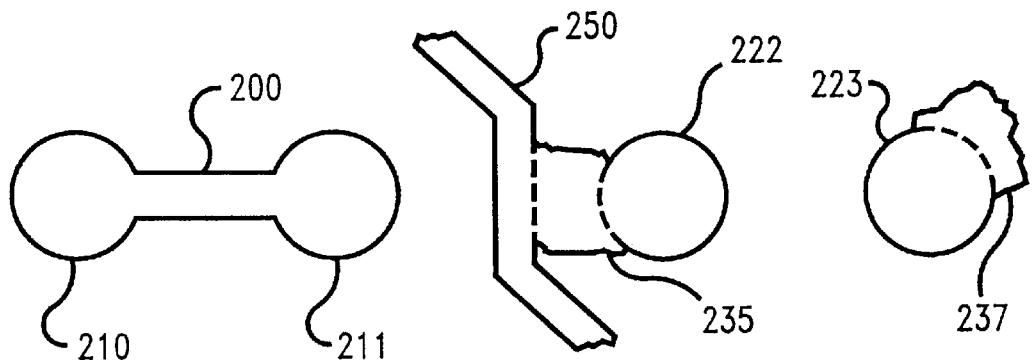
FIGS. 3a and 3b are top plan diagrammatic representations of the removal of unwanted surface metallurgy in accordance to a preferred embodiment of the present invention.
Figure 3B:
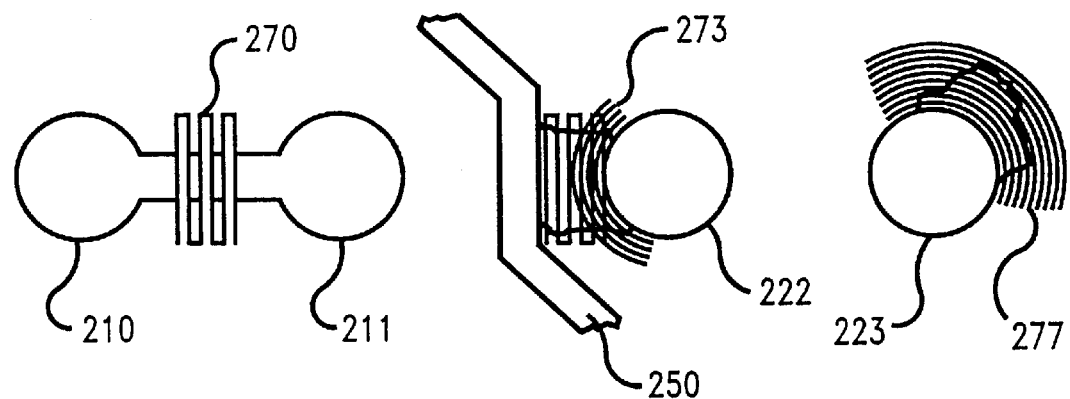

In FIGS. 3a and 3b, a third embodiment of the present invention is shown wherein just surface metallurgy needs to be removed to electrically isolate desired features. These features can be EC links designed to customize a given pattern to a specific application, surface defects due to errors in manufacturing, design errors, or simply to improve aesthetics.

FIG. 3a illustrates surface features where it would be desirable to remove surface metallurgy by use of the process of the current invention. In this illustration, it is desirable to cut the EC link 200 between pads 210, and 211; or to remove the plating flash 235 and 237 on pads 222 and 223. Linear translation paths 270, circular translation paths 277, or combinations paths 273 can be utilized as needed for the application as shown in FIG. 3b.

As described above, the AlN substrate is placed in the work chamber 400 and the repair site located. The laser beam is translated over the desired metallurgy with just enough fluence to remove the surface metallurgy. As shown in FIG. 3b, the circular path 277 translates only partially about the circular feature, but in some cases it is possible to translate the beam about the entire feature with no detrimental effects. Alternatively, as described above, an imaged laser beam can also be utilized to remove the metallurgy with or without translation of the beam over the repair area.

Additionally, for certain repair and EC link geometries, it may be desirable and possible to repair these areas in just a single pass of the focused laser beam to decrease process time. Depending on the laser fluence, spot size and the thickness of the metallization, it may not be necessary to translate the laser beam for more than one pass to completely isolate the circuit.

Following this type of surface process, it is not necessary to fill the repaired area with the sealant as in the previous embodiments, and the substrate is immediately ready to use.

Another important aspect is that the laser beam can 'trim' on surface or buried metallized layers in a similar manner as above, thus producing trimmable resistors, capacitors, etc. with very good control/reproducibility on their required properties.

Figure 4A:
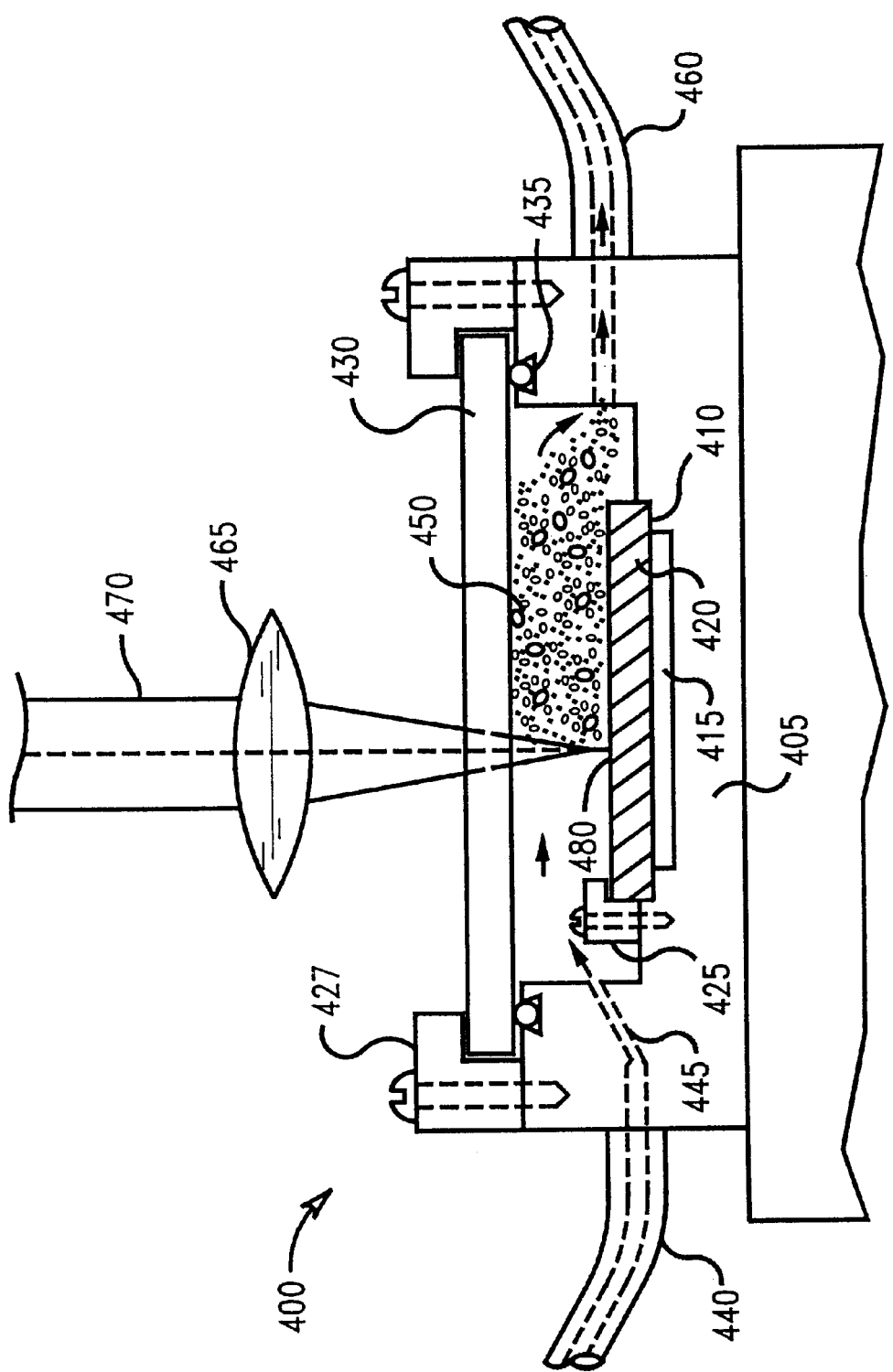
FIGS. 4a and 4b are an elevated cross-sectional view of the work chamber and an elevated top plan view of the work chamber, respectively, of the present invention.
Figure 4B:
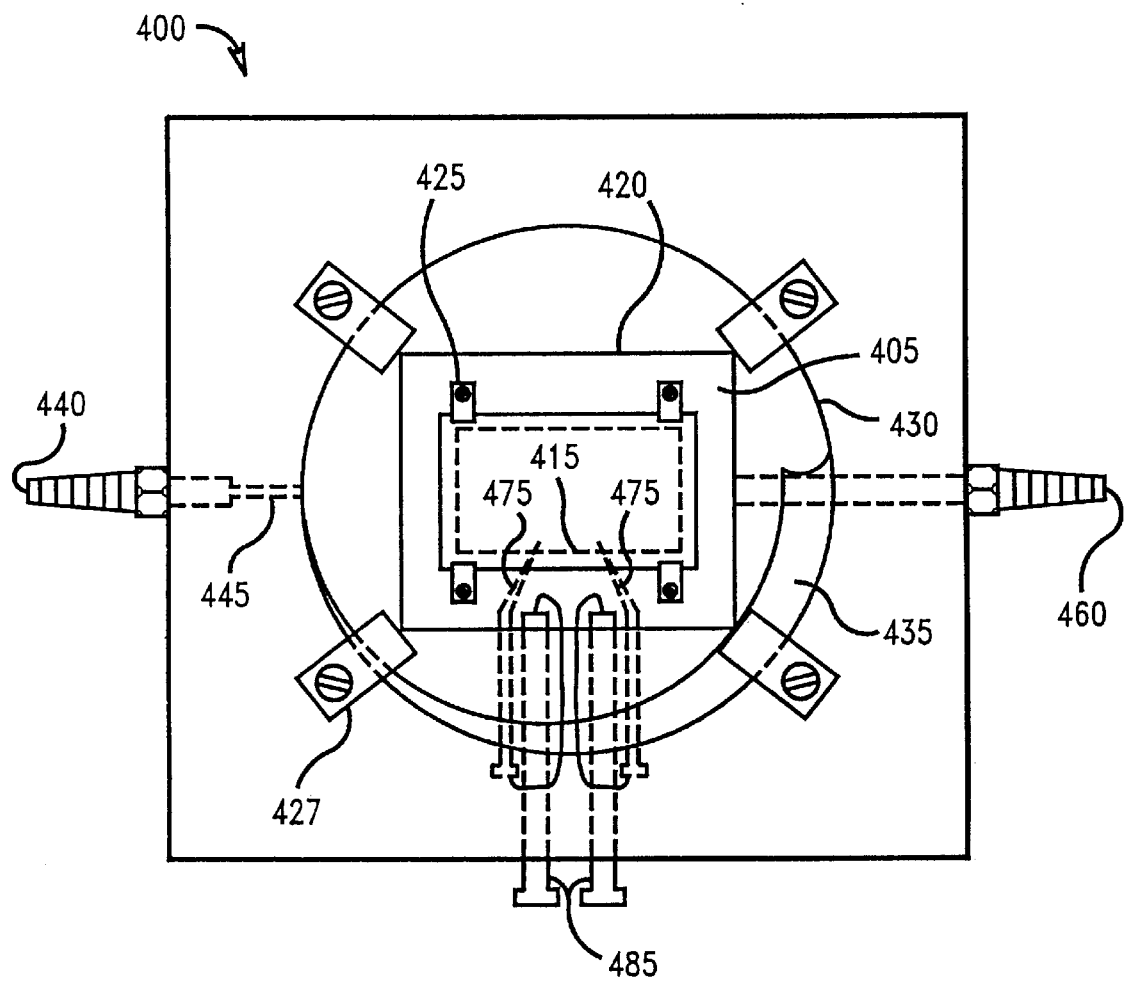

FIGS. 4a and 4b show a side and top plan view, respectively, of the liquid filled work chamber 400 of the present invention. The chamber body 405 can be fabricated from any of a family of engineering plastics such as nylon, Teflon®, or Delrin® or non-corrosive materials such as stainless steel. The present embodiment incorporates a shoulder 410 and recessed bottom portion 415 to hold the substrate 420 by its edges such that the metallurgy on the bottom side of the substrate 420 is not in contact with the recessed bottom portion 415. Clamps 425 are used to keep the substrate 420 securely in place. The recessed portion 415 can allow the liquid to contact the bottom of the substrate or be designed so that it seals with the substrate 420 at the shoulder 410 to maintain a liquid-tight seal as desired.

A cover 430, transparent to the laser beam 470, preferably quartz, is placed over the work chamber 405. Clamps 427 secure the cover 430 to the chamber body 405. The cover 430 is clamped against an O-ring 435 to prevent leakage of the liquid. The work chamber 405 incorporates at least one supply liquid port 440 with nozzle 445 that increases the velocity and directs the liquid to sweep the bubbles 450 formed by the repair process from the bottom of cover 430. These bubbles 450 if left to adhere to the underside of the cover 430 would obscure the repair site 480 and/or deflect or absorb the laser beam 470 making such repairs difficult or impossible. A liquid return tube port 460 is also utilized to allow the liquid to exit the work chamber 400 and be discarded. Although one nozzle is depicted, it may be necessary or desirable to utilize more than one nozzle to provide a more uniform coverage over the repair area or to provide coverage when processing other areas of the substrate.

Although it is possible and sometimes desirable to do some small repairs where a work chamber is not utilized by placing a small drop of water over the repair site, it is undesirable to do so because the surface tension of the water creates a spherical surface. The spherical surface of the water droplet alters the point of focus for the laser beam, varying the energy density seen at the repair site as well as the location of the laser beam as it traverses the repair area. In addition, the bubbles formed by the laser plasma accumulate at the surface of the water droplet and occlude the repair area making reliable repairs more difficult.

The objective lens 465 for the laser beam 470 is selected so that the working distance, laser spot size and repair site 480 viewing are all within acceptable limits. The top plan view of the work chamber 400 shown in FIG. 4b also shows probes 475 which allow end point detection when necessary for the repair of buried or surface metallurgy. These probes can be connected by wires to liquid tight connections that provide contacts 485 to test equipment placed outside the work chamber.

Although 2 probes are shown, more can be used to facilitate multiple repairs. It is not necessary to insulate the wires from the liquid because non contaminated deionized water has a very high resistance (>2 Meg Ohms/inch). In operation, a volt-ohm meter is used (or other suitable device depending on the response to be measured). For opening a buried line, the ohm meter is connected across the net to be severed using the internal probes, and typically reads 3 to 5 Ohms. As the repair process proceeds, the resistance will remain low until the circuit is broken wherein the resistance will climb to approximately 1 Meg Ohm. When the substrate is removed from the work chamber and fully dried, the resistance will be in the range of 5 to 10 Meg Ohms indicating that the repair is complete.

The present invention achieves the objects recited above. The method of severing unwanted metallurgy to repair an AlN substrate or to perform an EC by placing the substrate in a work chamber of the present invention effectively isolates the defect and prevents shorting. Placing the substrate in the liquid filled chamber allows the laser to produce enough energy to cut through the substrate material and sever unwanted connections or to remove unwanted metallurgy, while preventing the aluminum from being formed or deposited on the substrate and causing shorts. It also prevents the severed metallurgy from adhering on and about the repair site.

The novel liquid filled chamber of the present invention is of a design that forms a jet of liquid directed proximate to the repair area for the purpose of sweeping the residue and air bubbles from the repair area to a drain port. The chamber may also facilitate electrical probes which allow end-point detection of the repair in progress.

Following successful repair, the repair area is filled with an insulating polymer to passivate and seal the repair area from contaminants. The polymer of the present invention is designed to adhere tightly to the walls of the substrate repair area without the aid of adhesion promoters. It is also designed for minimal shrinkage during curing to enhance its adhesiveness and ability to fill the repair area. Its superior flowability in filling the repair area does not require planarization for further processing of the substrate.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of removing surface metallurgy on an aluminum nitride substrate comprising the steps of:

(a) providing a liquid filled chamber having an optical window;

(b) providing an aluminum nitride substrate having surface metallurgy in need of removal;

(c) placing said substrate inside said chamber;

(d) providing a laser energy source;

(e) applying said laser energy source through said optical window to remove said surface metallurgy on said substrate;

(f) forming a repair area where said surface metallurgy has been removed;

(g) sealing said repair area by applying to the repair area a polymer having the structure

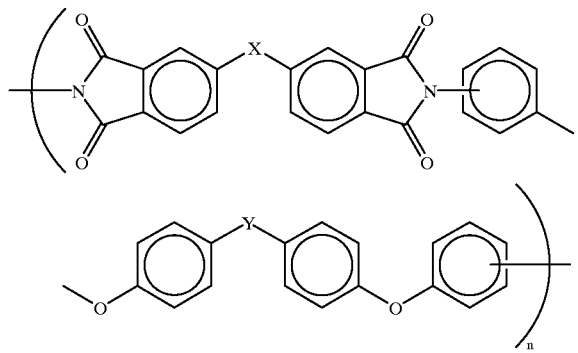

wherein X is selected from the group consisting of O, $C(CF_3)_2$, and CO, and wherein Y is $C(CF_3)_2$, and curing the polymer.

2. A method of repairing an aluminum nitride substrate comprising the steps of:

(a) providing a liquid filled work chamber;

(b) providing an aluminum nitride substrate having metallization;

(c) placing said substrate inside said chamber;

(d) removing a portion of said metallization of said substrate and forming a repair area, wherein said liquid filled work chamber sufficiently cools said substrate, and said repair area is substantially free from elemental aluminum;

(e) filling said repair area with an insulating polymer comprising a polyimide material having the structure

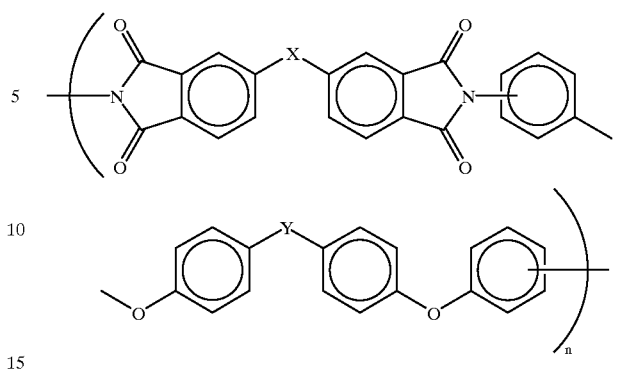

wherein X is selected from the group consisting of O, $C(CF_3)_2$, and CO, and wherein Y is $C(CF_3)_2$; and (f) heat curing the insulating polymer to passivate and seal the repair area.

3. The method according to claim 2, wherein said liquid filled work chamber has an optical window and wherein step (d) comprises removing a portion of said metallization by transmitting a laser energy source through said optical window.

4. The method according to claim 3, wherein said laser energy source is a YAG laser.

5. The method according to claim 2, wherein step (a) comprises providing a deionized water filled work chamber.

6. The method according to claim 2, wherein step (a) comprises providing a liquid filled chamber having a jet of liquid directed proximate to said repair area.

7. The method according to claim 6, wherein during step (d) said jet of liquid within said liquid filled chamber sweeps away residue and air bubbles from said repair area during said step of removing said metallization.

8. The method according to claim 2, wherein during step (d) the formation of elemental aluminum is minimized.

9. The method according to claim 2, further including the step of removing residue produced during said step of removing said metallization.

10. The method according to claim 2, further including the step of cooling said substrate to room temperature at a rate of 3° C./minute.

11. The method according to claim 2, wherein the step of heat curing the insulating polymer includes:

heating said substrate at about 80° C. to 90° C. for about 30 minutes;

followed by heating said substrate at about 140° C. to 150° C. for about 30 minutes;

followed by heating said substrate at about 210° C. to 230° C. for about 30 minutes; and a final curing at about 300° C. to 375° C. for about 30 to 60 minutes.

12. The method according to claim 11, wherein the rate of heating said substrate is 5° C./minute.

13. The method according to claim 2, wherein the step of filling the repair area with the insulating polymer comprises at least one application of said polymer.

14. The method according to claim 13, further including the step of at least partially curing the insulating polymer prior to each application of the polymer.

15. The method according to claim 2, wherein the steps of filling and heat curing the repair area with an insulating polymer comprises:

filling the repair area with a first portion of the polymer;

heat curing the first portion of the polymer;

filling the repair area with another portion of the polymer;

heat curing the another portion of the polymer; and repeating the filling and heat curing steps until the repair area is substantially filled with the cured polymer.

16. A method of repairing an aluminum nitride substrate comprising the steps of:
(a) providing an aluminum nitride substrate having at least one microelectronic device;
(b) immersing said substrate in a liquid;
(c) machining a portion of the microelectronic device while said substrate is immersed to form a repair area; and
(d) sealing said repair area with a polymer, said polymer having the structure

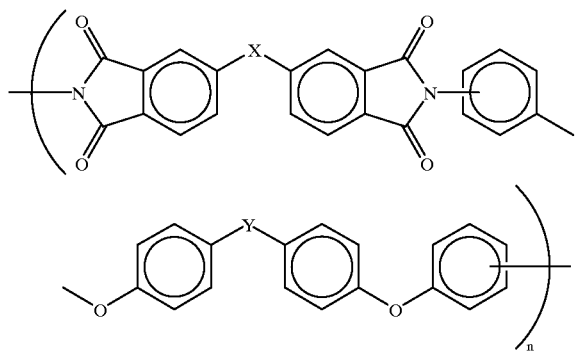

wherein X is selected from the group consisting of O, $C(CF_3)_2$, and CO, and wherein Y is $C(CF_3)_2$.

17. A method of repairing an aluminum nitride substrate comprising:
providing an aluminum nitride substrate in need of repair;
providing a laser energy source;
immersing in a liquid at least a portion of an area of the aluminum nitride substrate in need of repair;
emitting said laser energy through said liquid over the portion of the aluminum nitride substrate in need of repair;
forming a repair area over the portion of the aluminum nitride substrate in need of repair, wherein immersing the aluminum nitride substrate in a liquid sufficiently cools the substrate when emitting said laser energy over the portion of the aluminum nitride substrate in need of repair such that said repair area is substantially free from elemental aluminum;
filling the repair area with a flexible chain polyimide material derived from non-rigid dianhydrides and aromatic diamines having at least one hexafluoroisopropylidene functionality; and
heating the repair area to cure the polyimide material and passivate and seal the repair area.

18. The method according to claim 1, wherein the insulating polymer polyimide material has the structure

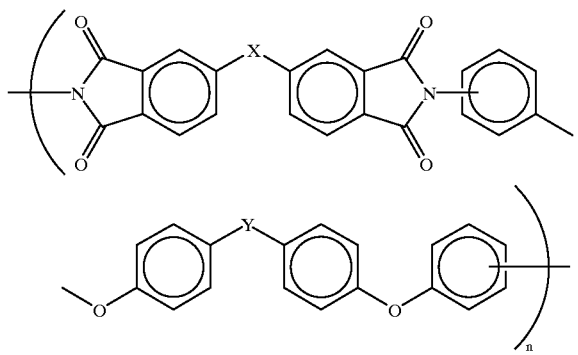

wherein X is selected from the group consisting of O, $C(CF_3)_2$, and CO, and wherein Y is $C(CF_3)_2$.

19. The method according to claim 18, wherein the step of filling said repair area with the polyimide material comprises at least one application of the polyimide material.

20. The method according to claim 19, further including the step of at least partially curing the insulating polymer prior to each application of the polymer.

21. The method according to claim 19, wherein filling and heating the insulating polymer in the repair area comprises:
filling the repair area with a first portion of the polymer;
curing the first portion of the polymer;
filling the repair area with another portion of the polymer;
curing the another portion of the polymer; and
repeating the filling and curing steps until the repair area is substantially filled with the cured polymer.

22. The method according to claim 21, wherein the heating of the insulating polymer comprises:
heating said substrate at about 80° C. to 90° C. for about 30 minutes;
followed by heating said substrate at about 140° C. to 150° C. for about 30 minutes;
followed by heating said substrate at about 210° C. to 230° C. for about 30 minutes; and
a final curing at about 300° C. to 375° C. for about 30 to 60 minutes.

23. The method according to claim 22, wherein the rate of heating of the substrate is 5° C./minute.

24. The method according to claim 23, further including the step of cooling said substrate to room temperature at a rate of 3° C./minute.

* * * * *